US 7,055,983 B1

(12) United States Patent
Baker et al.

(10) Patent No.: US 7,055,983 B1
(45) Date of Patent: Jun. 6, 2006

(54) TACKLE AND STORAGE BOX WITH ROTATABLE LIGHT

(75) Inventors: Todd C. Baker, Pfafftown, NC (US); Penny Brooks, Pfafftown, NC (US)

(73) Assignee: Brooks & Baker LLC, Pfafftown, NC (US)

( * ) Notice: Subject to any disclaimer, the term of this patent is extended or adjusted under 35 U.S.C. 154(b) by 0 days.

(21) Appl. No.: 11/057,448

(22) Filed: Feb. 14, 2005

Related U.S. Application Data

(60) Provisional application No. 60/611,217, filed on Sep. 20, 2004, provisional application No. 60/580,127, filed on Jun. 17, 2004.

(51) Int. Cl.
*F21V 131/30* (2006.01)
(52) U.S. Cl. .................. 362/154; 362/156; 362/191
(58) Field of Classification Search .......... 362/253, 362/154, 156, 190, 191
See application file for complete search history.

(56) References Cited

U.S. PATENT DOCUMENTS

| 2,179,214 | A | | 11/1939 | Hallbauer |
| 3,680,224 | A | * | 8/1972 | Hall .................... 434/308 |
| 3,772,527 | A | | 11/1973 | Darling et al. |
| 3,938,132 | A | | 2/1976 | Cunningham |
| 4,511,954 | A | | 4/1985 | Marcus et al. |
| 4,621,308 | A | | 11/1986 | Holmberg et al. |
| 4,691,470 | A | | 9/1987 | Landell et al. |
| 4,697,379 | A | | 10/1987 | McPhaul |
| 4,855,881 | A | | 8/1989 | Pence |
| 5,071,004 | A | | 12/1991 | Rivera |
| 5,311,413 | A | | 5/1994 | Farmer et al. |
| 5,333,408 | A | | 8/1994 | Simmons |
| 5,459,648 | A | | 10/1995 | Courtney |
| 5,505,354 | A | | 4/1996 | Hutton et al. |
| 5,611,170 | A | | 3/1997 | McGuff et al. |
| 5,624,029 | A | | 4/1997 | Shih |
| 5,685,421 | A | | 11/1997 | Gilmore |
| 5,833,352 | A | | 11/1998 | Goodwin |
| 6,045,236 | A | | 4/2000 | Cheng et al. |
| 6,053,315 | A | | 4/2000 | Yao |
| 6,193,062 | B1 | | 2/2001 | Rysgaard et al. |
| 6,254,251 | B1 | | 7/2001 | Washington |
| 6,267,240 | B1 | | 7/2001 | Callaway |
| 6,267,484 | B1 | | 7/2001 | Baker et al. |
| 2003/0090895 | A1 | | 5/2003 | Guerrieri |
| 2004/0125597 | A1 | * | 7/2004 | Einav |

OTHER PUBLICATIONS

Flambeau Outdoors, Fishing—Tackle Boxes (exclusive of discussion of Night-Ranger (TM) -7045) www.flambeauoutdoors.com/oldrs fishing/tackle boxes/kwikdraw ftload.html.

* cited by examiner

*Primary Examiner*—Laura Tso
(74) *Attorney, Agent, or Firm*—Robert W. Pitts

(57) ABSTRACT

A lighted storage box assembly is especially suited for use as a fishing tackle box, but can also be employed for storing may other articles. The asssembly includes a box with a rotatable lamp assembly mounted on the box's lid. Major portions of the box can be fabricated from a translucent material so that the light can shine through the box and the contents of the box can be seen even when closed. The lamp assembly includes an LED and rotation of a cylindrical lens turns the LED on and off. The position of the lamp is changed by rotation the battery compartment on which the lamp or LED is mounted. The lamp assembly is small and does not significantly reduce available storage space.

20 Claims, 4 Drawing Sheets

TACKLE AND STORAGE BOX WITH ROTATABLE LIGHT

CROSS REFERENCE TO PRIOR CO-PENDING APPLICATIONS

This application claims benefit of U.S. Provisional Patent Application Ser. No. 60/580,127 filed Jun. 17, 2004 and U.S. Provisional Patent Application Ser. No. 60/611,217 filed Sep. 20, 2004.

BACKGROUND OF THE INVENTION

1. Field of the Invention

This invention is related to a portable lighted storage boxes or containers. More specifically, this invention is related to a lighted tackle box, tool box, first aid container, or other similar container or box having a light for illuminating the box, its contents and the surrounding area.

2. Description of the Prior Art

There are many applications in which the contents of a portable storage box are to be used at night or in relatively low light conditions. In many such applications, the user can easily use a flashlight or other source of portable illumination. However, the use of a flashlight either requires the user to use one hand to hold the flashlight, leaving only one hand free or requires two people to perform an activity that would require only one if there were adequate light. For example a fisherman would typically need both hands to change lures, which can be difficult when fishing at night. Of perhaps more significance is the need of an emergency worker to have both hands free to apply first aid to an injury.

A number of prior art light portable boxes have been proposed, but these boxes typically have poor illumination which not only fail to adequately illuminate the contents of the box, but also fail to illuminate the immediate surrounding area. U.S. Pat. No. 3,938,132 discloses one such illuminated fishing tackle box that has a small light to illuminate the interior of the box, but also has an external light mounted on one end of the box to serve as a flashlight as the fisherman walks about during the night. This box uses only a single point source of light, which fails to provide sufficient illumination.

In many applications, the portable box also includes fold out trays, which open to expose the remainder of the storage area of the base of the box. U.S. Pat. No. 4,621,308 discloses one such box in which a light source is mounted on top of the fold out trays to illuminate the trays. The light source is however located so that it will adequately illuminate only the trays with the larger storage area in the box remaining in the dark.

U.S. Pat. No. 5,611,170 discloses a version in which a flexible light wand is located on one of the folding trays in a fishing tackle box. This point source of light would illuminate only a small part of the contents of the box at any one time, and although it could illuminate most parts of the box, one at a time, it provides no means for illuminating the entire box, including the trays, but also the immediate area surrounding the box, where the user would most likely perform any tasks that would either require or be greatly facilitated by the presence of adequate light.

U.S. Pat. No. 4,697,379 and U.S. Pat. No. 5,333,408 are other examples of lighted fishing tackle boxes.

U.S. Pat. No. 6,267,484 overcomes a number of these disadvantages of the prior art. The tackle box shown in that patent employs a fluorescent light extending between opposite ends of the tackle box lid, and requires a relatively large battery. That apparatus therefore can be rather heavy and the lighting can reduce the amount of storage space available in the container. That device also employs a nonstandard arrangement of trays, which are positioned on an opposite side of the base from the open lid.

The instant invention overcomes these advantages by employing a small lamp or LED, which is rotatable relative to a hinged lid so that the light occupies only a small space and can be oriented in a large number of positions relative to the main storage area of the box and relative to pull out trays.

SUMMARY OF THE INVENTION

According to one aspect of this invention, a lighted storage box assembly includes a box and a lamp assembly. The box has a base and a lid pivotal relative to the base between an open and a closed position. The lamp assembly includes a battery powered lamp and a battery compartment in which batteries for powering the lamp can be positioned. The lamp assembly is pivotally mounted on an interior surface of the lid. The battery powered lamp and the battery compartment are rotatable as a unit relative to the lid, so that light emitted by the battery powered lamp can be directed toward the base or away from the lighted storage box when the lid is in the open position.

According to another aspect of this invention, the lamp assembly the box is at least partially fabricated from a material, which transmits light so that contents of the box can be observed through the box when light is emitted by the battery powered lamp, and the light can illuminate an area adjacent the exterior of the box.

The storage box can comprise a lighted tackle box and the light can be an LED and as a partial result the entire light assembly will occupy only a small volume. When the lamp assembly into rotated into a recessed position only the lens protrudes into the base so as not to diminish the storage capacity of the lighted storage box.

DETAILED DESCRIPTION OF THE PREFERRED EMBODIMENT

Figure 1:
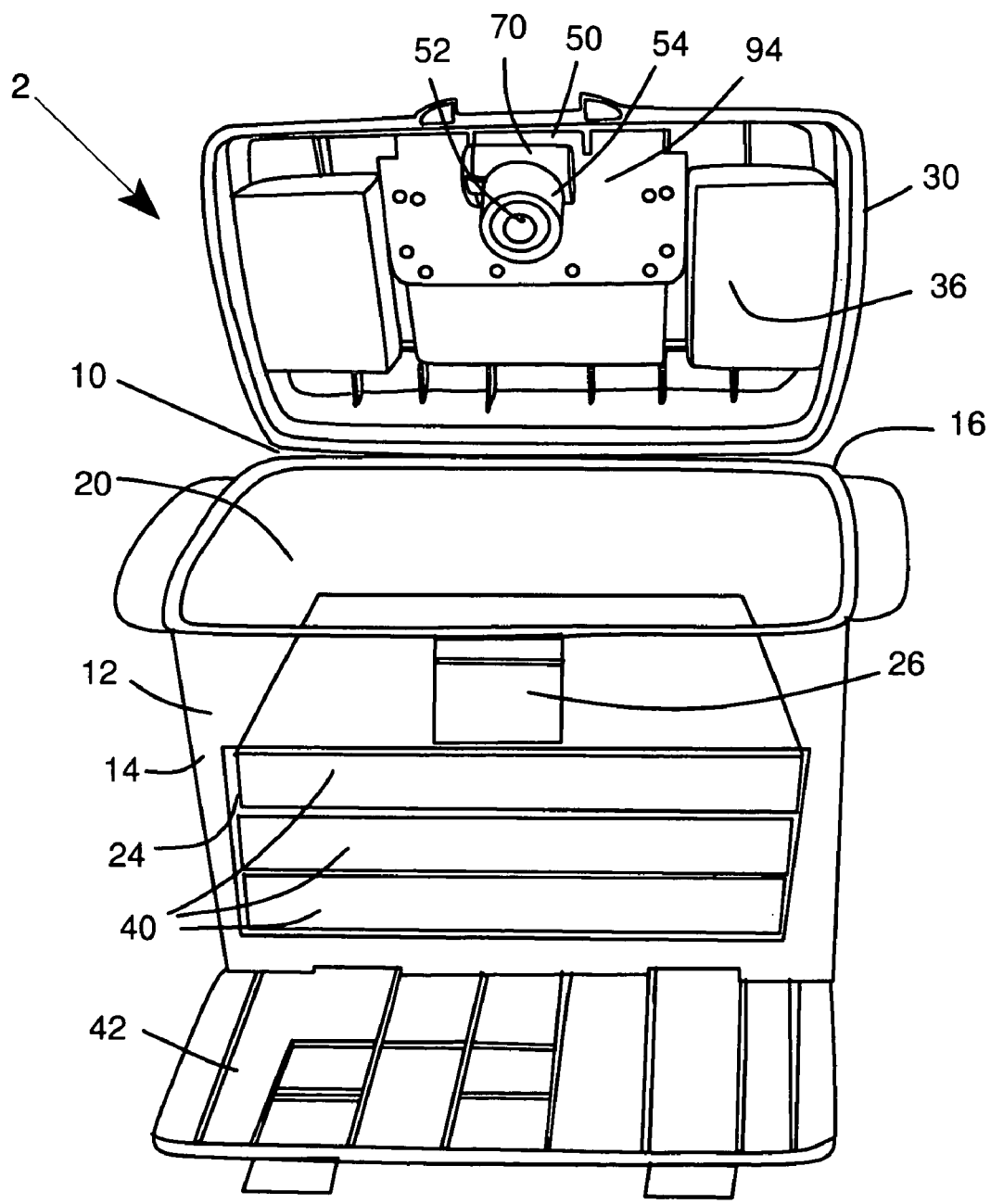
FIG. 1 is a view of a lighted tackle or storage box with the lid opened to reveal a lamp mounted on the interior surface of the lid.

The lighted tackle box 2 according to the preferred embodiment of this invention is shown in the open configuration in FIG. 1. Although this version of the invention is specifically for use as a lighted fishing tackle box, the same basic elements can be employed in many storage box configurations or containers. For instance, the basic elements of this invention could be employed in a portable lighted emergency medical bag, such as those, employed by emergency medical technicians. Other versions incorporating the elements of this invention could include tool boxes, luggage or storage trunks or even document storage boxes or containers. The elements of this invention might even be employed in a briefcase, where the light could be used as a reading lamp. A student's backpack could also incorporate the elements of this invention. These are but a few examples of the storage boxes, which could employ this invention, the basic components of which are described with reference to this tackle box comprising the preferred embodiment.

The tackle box 10, which together with the lamp assembly 50 comprises the lighted box assembly 2, includes a box base 12 and mating box lid 30. The box 10, as depicted herein, is intended to illustrate that the lighted storage box assembly 2 can, in its most general embodiments, be assembled with only minor modifications to a conventional storage or tackle box. Therefore it should be clear that the assembly 2 can include other standard or special purpose boxes, and the invention is not limited to the specific box shown herein.

Tackle box 10 includes a number of components, including a box base 12, a box lid 30, a plurality of pull out trays 20 extractable from the base 12 through a front face 14 and a hinged door 42 that will hold the trays 20 in position when the door 42 is latched. When the hinged door 42 is unlatched and rotated downward and outward into an open position, the trays 20 can be extracted through the front face 14 of the box base 12, which generally has the shape of a rectangular solid with an upwardly facing opening 20 forming a mating face. The box base 12 is preferably a one-piece member having a front face 14, a rear face 16, a bottom face 18 and a bottom face. The front face 14 is partially open to make room for pull out trays 40 in a compartment 24, and in the preferred embodiment three trays 40 can be positioned, one on top of another. Although not shown, an internal shelf can extend from the front face 14 to the rear face 16 above the location for the trays, and this shelf can be an integral part of the one-piece base housing. Since the box base 10 comprises a one-piece housing, the entire box base can be injection molded from a suitable plastic material. This one-piece member can molded from a plastic that is at least partially light transmissive. Preferably the box base 10 is molded from a translucent plastic so that the light on the interior of the lighted storage box assembly 2 can shine through the translucent base 10. This permits allows a user to inspect the contents of the lighted storage box assembly 2 even when the lid 30 is closed, and the lighted storage box can be used to illuminate the immediate surrounding area as well. As shown in FIG. 1, the trays 40 can be seen through the front face 14. Preferably, the pull out trays 40 would also be molded of a light transmissive or translucent plastic so that their contents can be lighted and so that the trays will not obstruct the passage of light from the lamp assembly 50. The hinged door 42 can be made of an opaque plastic, since it can be folded out of the way, even when the lid 30 is in the closed position. Alternatively, the hinged door 42 can be molded from a light transmissive material.

Figure 2:
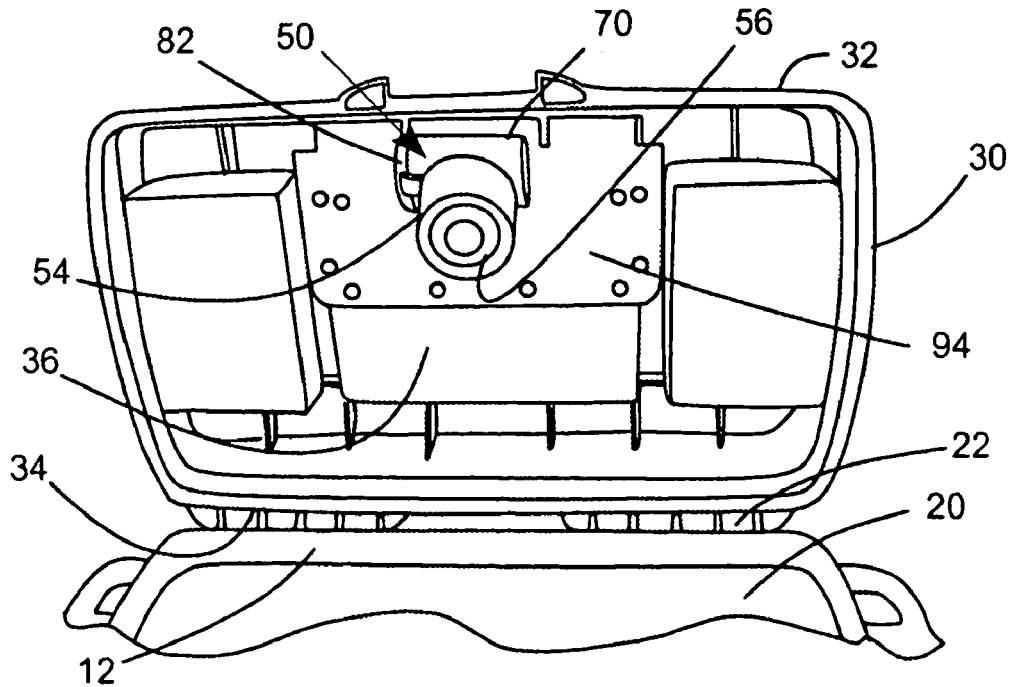
FIG. 2 is a view of the lid of the box shown in FIG. 2 showing the lamp positioned generally perpendicular to the interior surface of the lid.
Figure 3:
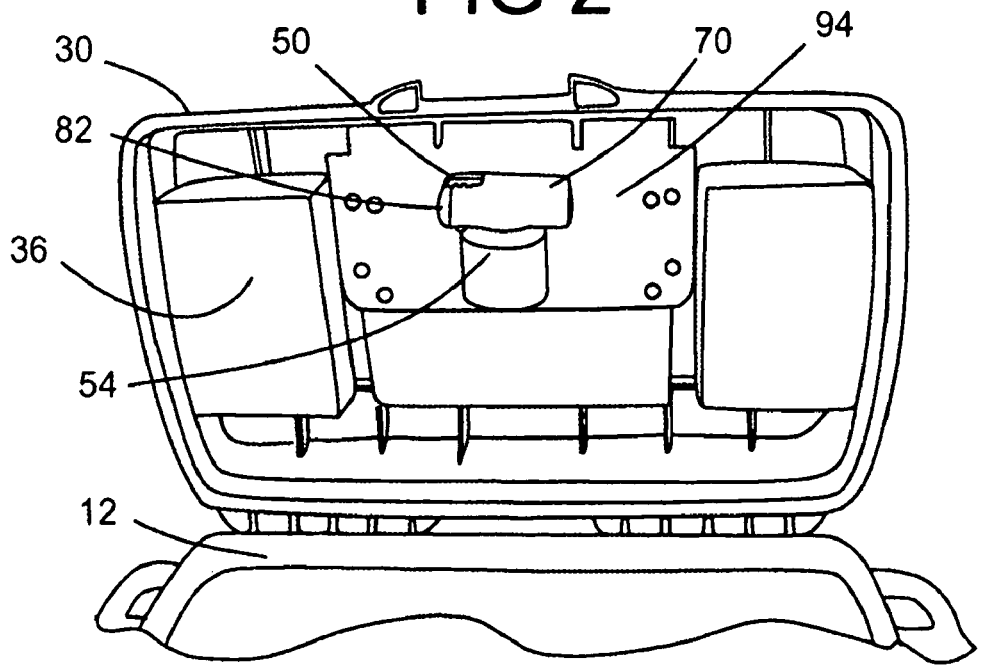
FIG. 3 is a view similar to FIG. 2 in which the lamp is rotated so as to face generally parallel to the interior surface of the lid.

The box lid 30 fits on top of the box base 12 to close the opening 20 and to secure the contents within the lighted storage box 2. Lid 30 has a front edge 32 that rotates upwardly when the lid 30 is opened, and the lid 30 is hinged about the rear edge 34 by hinge 22. A conventional latching mechanism, not shown, can be provided along the front edge 32 for engagement with a conventional latch 26 located on the base front face 14 just below the upwardly facing opening 20. The interior face 36 of the box lid 30 is shown in FIGS. 1–3, and the lamp assembly 50 is mounted on this interior lid face 36. A conventional handle, not shown, is mounted on the top of the lid 30.

Figure 4:
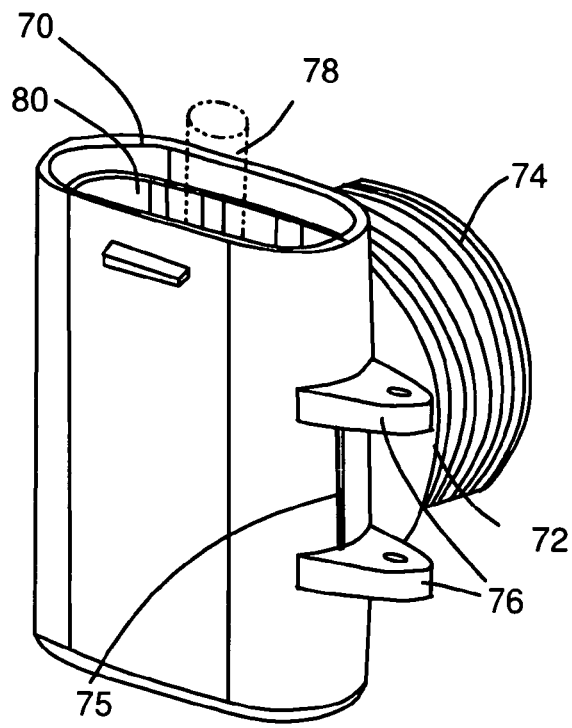
FIG. 4 is a view of the lamp housing showing the open battery compartment.
Figure 5:
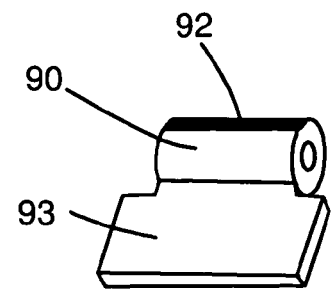
FIG. 5 is a view of the mounting hub employed in mounting the lamp housing and in holding the lamp in different angular orientations

The lamp assembly 50 mounted on the interior of the box lid 30 includes a lamp 52, a lens 54, a lamp receptacle 62, batteries 78, a lamp housing 70, a hub 90, and a mounting plate 94. Lamp assembly 50 is mounted adjacent the lid front edge 32 so that the lamp assembly 50 will be elevated relative to the box base housing 12 and contents of the box 10, when the lid is in the open position as shown in FIGS. 1–3. In the preferred embodiment the lamp or lighting element 52 comprises a light emitting diode that is powered by three standard AAA dry cell batteries 78, one of which is shown in FIG. 4. The batteries 78 are mounted side by side in a battery compartment 80 formed in a one-piece molded lamp housing 70. A cover 82 is securable to the lamp housing 70 to the close the battery compartment 80, as seen in FIGS. 2 and 3. The details of the lamp housing 70 are shown in FIG. 4. The battery compartment 80 opens on one end and a cylindrical shaft 72 extends from one side of toward the front of the lamp assembly 50 when viewed in FIGS. 2 and 3. Helical threads 74 extend around a portion of this cylindrical shaft 72, and conventional electrical leads, not shown, extend from the interior of the cylindrical shaft 72 into the battery compartment 80 so that the batteries 78 can be connected to the lamp or LED 52.

Figure 6:
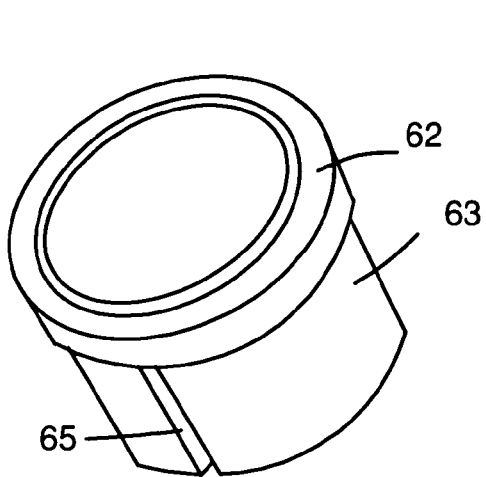
FIG. 6 is a view of the lamp receptacle in which a light emitting diode is mounted.
Figure 7:
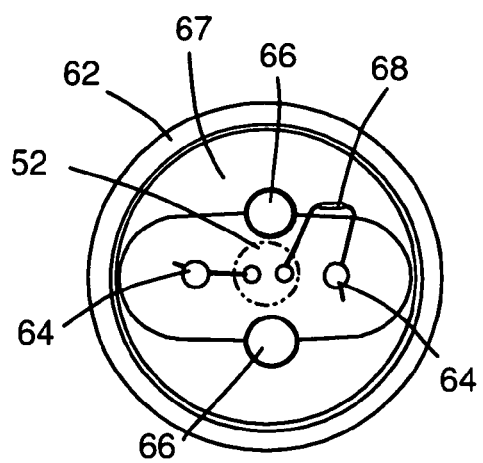
FIG. 7 is a view of the rear surface of the lamp receptacle showing electrical contacts, coil springs and a resistor.

The lamp or LED 52 is mounted in a lamp receptacle 62 shown in FIGS. 6 and 7. Lamp receptacle 62 comprises a one-piece member having a cylindrical portion 63 closed at one end 67 and open on the front when viewed in FIG. 6. The diameter of the cylindrical portion 63 is small enough so that the lamp receptacle cylindrical section 63 adjacent to the closed end 67 will fit within the lamp housing cylindrical shaft 72. A slot 65 extend along the receptacle cylindrical section 63 from the closed end 67, and a key, not shown, on the interior of the lamp housing shaft 72 will fit within this slot 65, so that the lamp receptacle 62 can be oriented in only one position relative to the housing shaft 72, and the lamp receptacle 62 cannot rotate relative to the lamp housing shaft 72. The exterior of the lamp receptacle 62 is shown in FIG. 7, and electrical contacts 64, which extend through the receptacle closed end 67 are seen. These electrical contacts are wired to the lamp or LED 52, which is mounted on the opposite side of the closed end 67 on the interior of the lamp receptacle 62. Contacts 64 extend outwardly and are therefore raised above the exterior surface of the closed end 67. Two coil springs 66 are positioned between the contacts 64 and these coil springs will push the lamp receptacle 62 outwardly within the housing shaft 72, so that the contacts 64 will not engage mating contacts, not shown, connectable to the terminals of batteries 78, unless these coil springs 66 are compressed. A resistor 68 is provided between one of the electrical contacts 64 and the corresponding terminal of the LED 52. When the lamp receptacle 62 is positioned within the cylindrical housing shaft 72, the slot 65 will align the electrical contacts 64 with the mating contacts, not shown, which are connectable to the terminals of the batteries 78.

Figure 8:
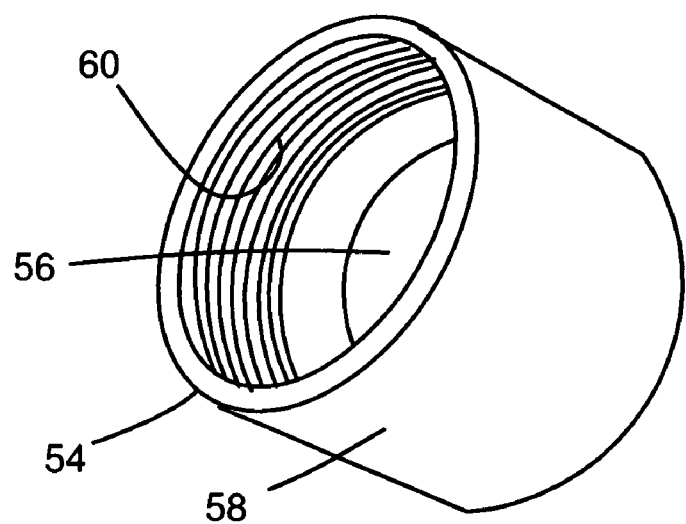
FIG. 8 is a view of the cylindrical lamp lens in which the threads employed in adjusting the lens relative to the lamp housing are shown.
Figure 9:
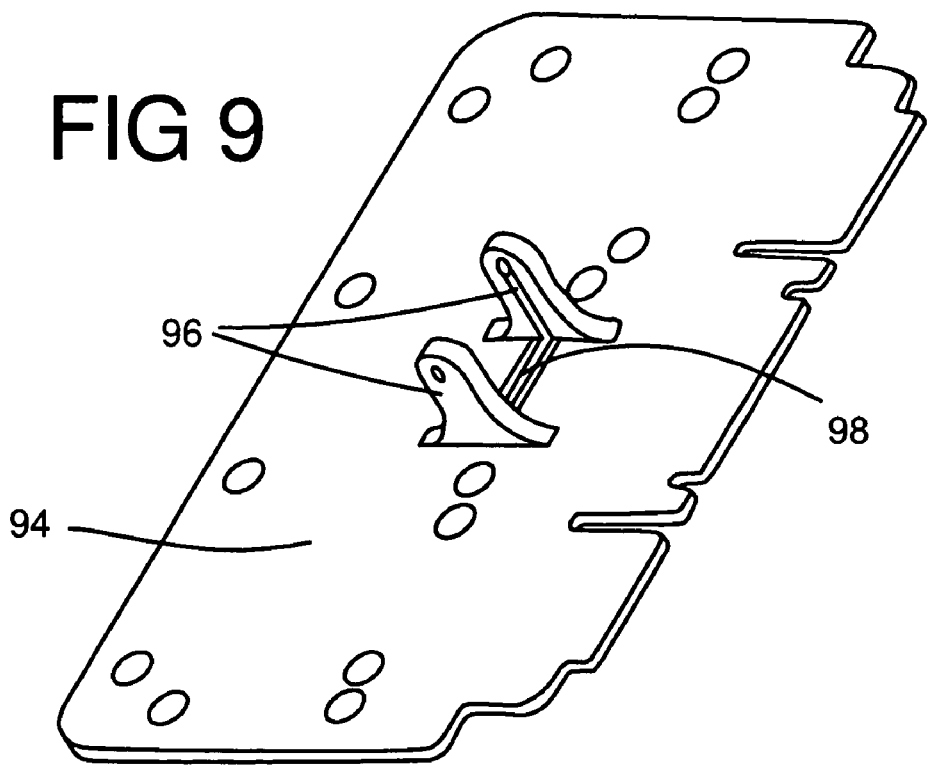
FIG. 9 is a view of a mounting plate employed to mount the lamp assembly on the interior surface of the lid.

After the lamp receptacle 62 is positioned within the cylindrical housing shaft 72, the lens 54, the third component of this subassembly, is positioned on the cylindrical shaft 72 with the lamp receptacle 62 trapped in the cylindrical housing shaft 72. As shown in FIG. 8, the lens 54 comprises another cylindrical member with circular sides 58 and a front face 56, best seen in FIG. 2 as well as in FIG. 8. Threads 60 on the interior of the lens cylindrical portion 58 will mate with threads 74 on the lamp housing shaft 72. These mating threads not only secure the lens 54 to the shaft 72, but also serve as a means to telescope the lens 54 relative to the shaft 72. As the lens 54 is screwed further onto the shaft 72, the lamp receptacle 72 is forced inwardly against the resistance of coil springs 66. Eventually the contacts 64 engage contacts leading to the batteries 78 and the lamp or LED 52 is connected to the batteries 78 to turn on the lamp 52. To turn the lamp off, the lens 54 is simply rotated in the opposite direction. The lens 54 is can be molded as one piece from a transparent plastic. A non-slip cover, not shown can be added around the exterior of the cylindrical lens sides 54, leaving the front face 56 unobstructed. This non-slip cover will make it easier to twist the lens 52 to either turn the lamp 52 on or off.

The lamp assembly 50 is mounted on a mounting plate 94, which is in turn mounted on the lid interior surface 36. Mounting plate 94 includes a number of holes that can each receive a post extending from the interior lid surface 36. Snap on fasteners can be secured to several posts to attach the mounting plate 94 to the lid 30. Alternatively the posts can be heat or ultrasonically staked to permanently secure the mounting plate to the housing lid 30.

The mounting plate 94 also includes two upright mounting supports 96, which are spaced apart just enough to receive two upright members which form a yoke 76 on the lamp housing 70. These two upright yoke members 76 extend from a lower corner of the lamp housing 70. Holes extend through each yoke member 76 and are in alignment with similar holes extending through the mounting supports 96 on the plate, when the lamp housing 70 is mounted on the mounting plate. A pin can extend through these aligned holes to secure the lamp housing 70 to the mounting plate 94.

A separate hub member 90 is also mounted between the lamp housing 70 and the mounting plate 94. This hub member 90 comprises a cylindrical hub having a plurality of grooves 92 extending from end to end. A hole extending through the hub 90 so that the hub can be mounted between the two yoke members 76 and on the same pin that attaches the lamp housing 70 to the mounting plate 94. A planar hub section 93 extends from the cylindrical hub 90, and has a width sufficient to be received within a mounting plate groove 98 extending between the two support members 96. When positioned in this manner, the hub 90 will not rotate relative to the mounting plate 94. A rib 75 extending between the two yoke members 76 on the lamp housing 70 has a height sufficient for partial receipt in the grooves 92 on the hub 90. This interference between the rib 75 and the hub grooves 92 is not sufficient to prevent rotation of the lamp housing relative to the hub 90 and to the mounting plate 94, but this interference is sufficient to hold the lamp assembly 50 in a fixed position until a sufficient force is applied to cause rotation of the housing assembly 50 relative to the lid 30. The entire lamp housing 70 can thus be rotated relative to the lid 30 between a number of stable positions in which the engagement of the rib 75 with an aligned groove 92 is just sufficient to hold the lamp assembly 50 in place. The lamp assembly is rotatable about an axis parallel to the tubular batteries located in the battery compartment 80.

FIGS. 2 and 3 show the extent to which the lamp assembly 50 can be rotated relative to the box lid 30. In FIG. 2, the lamp assembly 50 is positioned so that the light from the lamp or LED 52 is directed substantially perpendicular to the lid interior surface 36. FIG. 3 shows that the lamp assembly has been rotated through an angle of approximately ninety degrees so that the light emitted by the lamp or LED 52 is directed substantially parallel to the mounting plate 94 and the lid interior surface 36. The lamp assembly 50 can also be oriented at a number of stable locations between the two extreme positions shown in FIGS. 2 and 3. With the lid 30 open, the lamp can be directed on a number of surfaces or articles in the lighted storage box 2 or toward the surrounding area. The lamp assembly 52 can also be positioned in these same orientations relative to the lid interior surface 36 when the lid 30 is closed. Two significant positions correspond to the extreme positions shown in FIGS. 2 and 3. When the lid 30 is closed with the lamp assembly 50 in the position shown in FIG. 2, the light emitted by the lamp or LED 52 will be directed toward the pull out trays 40 and their contents. If as intended in this embodiment, the trays 40 and the box base 12 are molded from a translucent or light transmissive material, then the illuminated contents of the closed lighted storage box 2 can be viewed from the outside, assuming of course that the light 52 has been turned on, and the relatively opaque door 42 has been opened. Illumination of the interior contents in this manner allows the user to close the lid 30 and store the trays 40 so that the contents will not be spilled if the box is accidentally overturned. In addition to permitting one to view the contents of the close box 2, some portion of the surrounding area can be illuminated with the lamp assembly 50 is oriented as shown in FIG. 2. If the lamp assembly 50 is oriented as shown in FIG. 2, the light will be directed though the rear face of the base housing 12 instead of illuminating the interior contents. By orienting the light in this manner a larger exterior area can be illuminate by the closed tackle box 2. The large variety of relative positions of the lamp assembly 50, the lid 30 and the box base 12 permit the light from lamp or LED 52 to be directed toward a number of different targets, and the light can be easily turned on and off in all of these positions. This flexibility is of course not limited to use of the storage box 2 as a tackle box. Many other applications can also benefit from this ability to redirect the light in this manner. In addition to the ease with which the light can be redirected, this configuration also results in a relative small lamp assembly 50, which employs a relatively bright and relatively focused light emitted by an LED. Since the lamp assembly 50 is relatively small it will not significantly reduce the storage space available in the box interior. When the lamp assembly 50 is oriented in the position shown in FIG. 2, only a portion of the lens 54 will extend beyond the edge of the lid 30 and through the opening 20 when the lighted storage box assembly 2 is in the closed configuration. This configuration can be referred to as the recessed position, because more storage space would be available in the box base 12 when the lamp assembly 50 is in this position. However, even when the lamp assembly 50 is in the position shown in FIG. 3, it will still not protrude significantly into the opening 20.

The tackle box depicted herein comprises only a representative embodiment of this invention. The lamp assembly employed herein is suitable for use with other standard as well as nonstandard storage box configurations. Although the use of translucent material adds an additional capability to this assembly, most of the advantages of arising from use of the lamp assembly depicted herein will still be present if the box is fabricated or molded from an opaque material or a material that does not transmit light. Similarly the use of an LED is advantageous, but it is not essential. Therefore this invention is defined by the following claims and is not limited to the preferred, but only representative, embodiment depicted herein.

The invention claimed is:

1. A lighted storage box assembly comprising:
   a box having a base and a lid pivotal relative to the base between an open and a closed position; and
   a lamp assembly, the lamp assembly including a battery powered lamp and a battery compartment in which batteries for powering the lamp can be positioned, the lamp assembly being pivotally mounted on an interior surface of the lid, the battery powered lamp and the battery compartment being rotatable about an axis parallel to tubular batteries located in the battery compartment as a unit relative to the lid, so that light emitted by the battery powered lamp can be directed toward the base or away from the lighted storage box when the lid is in the open position.

2. The lighted storage box assembly of claim 1 wherein the battery powered lamp and the battery compartment can be rotated between a position in which light emitted by the battery powered lamp is directed parallel to the interior surface of the lid and a position in which light emitted by the battery powered lamp is directed perpendicular to the interior surface of the lid.

3. The lighted storage box assembly of claim 1 wherein the lamp assembly is mounted adjacent a front edge of the lid and spaced from a hinged edge of the lid so that the lamp assembly is raised away from the base when the lid is opened.

4. The lighted storage box assembly of claim 1 wherein the battery powered light comprises a light emitting diode and a lens aligned with the light emitting diode.

5. The lighted storage box assembly of claim 4 wherein the lens is rotatable to telescope relative to the battery compartment between a first position in which the light emitting diode is electrically connected to batteries in the battery compartment and a second position in which the light emitting diode is disconnected from the batteries.

6. The lighted storage box assembly of claim 5 wherein the battery compartment is configured to accommodate tubular batteries and the lens includes a front face and cylindrical projection telescoping around a cylindrical shaft extending from the battery compartment, both the cylindrical projection and the cylindrical shaft extending perpendicular to the orientation of batteries in the battery compartment.

7. The lighted storage box assembly of claim 6 wherein the light emitting diode is mounted on a bottom face of a cylindrical receptacle positioned within the cylindrical hub and abuttable with the lens, the cylindrical receptacle being movable fore and aft so that the light emitting diode can be connected to and disconnected from batteries in the battery compartment.

8. The lighted storage box assembly of claim 6 wherein the cylindrical projection includes screw treads matable with screw threads on the cylindrical shaft.

9. The lighted storage box assembly of claim 1 wherein the lamp assembly is mounted on the lid so as to be rotationally stable in a plurality of positions so that lamp assembly can be positioned to direct light in different directions.

10. The lighted storage box assembly of claim 9 wherein the lamp assembly is mounted on a hub, the hub containing a number of parallel grooves so that a tab extending from the battery compartment can be snapped into each of the grooves to maintain the lamp in a selected orientation relative to the lid.

11. A lighted storage box assembly comprising:
    a box having a base and a lid pivotal relative to the base between an open and a closed position; and
    a lamp assembly, the lamp assembly including a battery powered lamp and a battery compartment in which batteries for powering the lamp can be positioned, the lamp assembly being pivotally mounted on an interior surface of the lid, so that light from the battery powered lamp can be emitted in a number of different directions relative to the lid and the base, wherein
    the box is at least partially fabricated from a material which transmits light so that contents of the box can be observed through the box when light is emitted by the battery powered lamp, and the light can illuminate an area adjacent the exterior of the box.

12. The lighted storage box assembly of claim 11 wherein the base is at least partially fabricated from a translucent material.

13. The lighted storage box assembly of claim 12 wherein the lid is fabricated from an opaque material.

14. The lighted storage box assembly of claim 11 wherein the box includes at least one tray mounted in the base, the battery powered lamp being rotatable to illuminate the tray when at least partially retracted from the base.

15. The lighted storage box assembly of claim 14 wherein the tray is fabricated from a translucent material.

16. A lighted tackle box comprising:
    a box having a base and a lid pivotal relative to the base between an open and a closed position; and
    a lamp assembly, the lamp assembly including a battery powered light emitting diode adjacent a lens and a battery compartment in which batteries for powering the light emitting diode can be positioned, the lamp assembly being pivotally mounted on an interior surface of the lid, so that light from the battery powered light emitting diode can be emitted in a number of different directions relative to the lid and the base when the lid is both open and closed, wherein
    the lamp assembly can be rotated into a recessed position in which only the lens protrudes into the base so as not to diminish the storage capacity of the lighted storage box.

17. The lighted tackle box of claim 16 wherein the lens extends perpendicular to a mating face between the lid and the base when the lamp assembly is in the recessed position.

18. The lighted tackle box of claim 17 wherein the battery compartment extends generally parallel to the mating surface between the lid and the base when the lamp assembly is in the recessed position.

19. The lighted tackle box of claim 18 wherein the lamp assembly is located adjacent to a latch on the lid.

20. The lighted tackle box of claim 16 wherein the lamp assembly is rotatable about a hub have an number of hub grooves, and wherein a housing forming the battery compartment includes an exterior rib engagable with the hub grooves to releasably hold the lamp assembly in multiple stable orientations.

* * * * *